United States Patent Office 3,378,557
Patented Apr. 16, 1968

3,378,557
5-ALKYL-2-AMINO-3-AMINOALKYL-6-ARYL-4(3H)-PYRIMIDINONES AND CONGENERS
Kurt J. Rorig, Glenview, and Hans A. Wagner, Skokie, Ill., assignors to G. D. Searle & Co., Chicago, Ill., a corporation of Delaware
No Drawing. Continuation-in-part of application Ser. No. 285,218, June 4, 1963. This application Aug. 31, 1965, Ser. No. 484,124
5 Claims. (Cl. 260—247.2)

ABSTRACT OF THE DISCLOSURE 5-hydrocarbon 2-amino-3-aminoalkyl-6-aryl-4(3H)-pyrimidinones and congeners useful as diuretics. The compounds are prepared by alkylating the appropriate 4-pyrimidinol with an amino alkyl halide.

The application for Letters Patent securing the invention herein described and claimed is a continuation-in-part of applicant's prior copending application Ser. No. 285,218 filed June 4, 1963, and now matured to U.S. 3,214,430.

This invention relates to 5-alkyl-2-amino-3-aminoalkyl-6-aryl-4(3H)-pyrimidinones and congeners, and to process for the manufacture thereof. More particularly, this invention provides new, useful, and unobvious chemical compounds of the formula

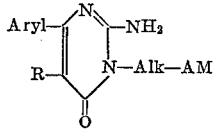

wherein the aryl radical called for is a phenyl, naphthyl, or like monovalent aromatic hydrocarbon grouping optionally substituted in each instance by an alkyl or alkoxy grouping, or by halogen; R represents an alkyl, alkenyl, or alkynyl radical; Alk represents an alkylene radical; and Am represents an optionally-alkylated amino radical.

Preferred embodiments of the described aryl radical are phenyl and chlorophenyl groupings, the halogen constituent being ortho, meta, or para ad libitum to the carbon through which the aryl nucleus attaches to the pyrimidinone ring.

The alkyl, alkenyl, and alkynyl radicals contemplated are desirably of lower order, i.e., contain no more than 8 carbon atoms. Illustrative of lower alkyl radicals are methyl, ethyl, propyl, isopropyl, butyl, isobutyl, sec-butyl, tert-butyl, pentyl, neopentyl, hexyl, isohexyl, heptyl, octyl, and like —$C_nH_{2n+1}$ groupings wherein $n$ represents a positive integer less than 9. Lower alkenyl and lower alkynyl radicals include vinyl, allyl, 2-methylallyl, butenyl (3-isomers), ethynyl, propynyl (2 isomers), and such other groupings as may be thought of as deriving by appropriate elimination of hydrogen from a lower alkyl grouping (exclusive of methyl) in favor of a double or triple bond. Preferred embodiments of R are methyl, allyl, and 2-propynyl radicals.

The alkylene radical represented by Alk is likewise advantageously of lower order, i.e., a methylene, ethylene, trimethylene, propylene, tetramethylene, 2-methyl-1,2-propylene, pentamethylene, 2,2-dimethyl-1,3-propylene, or like bivalent, saturated, acyclic, straight- or branched-chain, hydrocarbon grouping having the formula —$C_nH_{2n}$— wherein $n$ has the meaning assigned above.

The expression "optionally-alkylated amino radical" subsumes both the primary amino radical, $NH_2$, and secondary and tertiary amino radicals resulting from the substitution of 1 or 2 alkyl radicals, respectively, for hydrogen therein—especially lower alkyl radicals, as hereinbefore defined. The alkyl radicals present when Am comprehends a tertiary amino grouping may either be discreet, thus

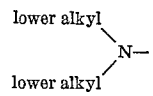

or they may be joined together directly or through oxygen or a second nitrogen atom to compose cyclic amino radicals optimally but not necessarily exclusively comprising at least 4 and as many as 6 carbon atoms as illustrated in the examples hereafter. Somewhat more broadly representative of the cyclic amino radicals contemplated are pyrrolidino, methylpyrrolidino, dimethylpyrrolidino, trimethylpyrrolidino, piperidino, methylpiperidino, dimethylpiperidino, methylethylpiperidino, morpholino, piperazino, methylpiperazino, ethylpiperazino, and like monovalent, 5- and 6-membered heterocyclic groupings. The terminal "ino" in the radical names set forth denotes attachment of the radicals thus characterized via nitrogen.

Preferred embodiments of the expression —Alk-Am are the groupings

—alkylene-N(lower alkyl)$_2$

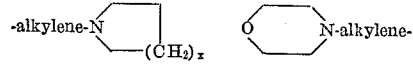

wherein the alkylene radicals contain more than 1 and fewer than 4 carbon atoms and $x$ is a positive integer less than 3.

Those skilled in the art will recognize that 2-aminopyrimidines of the type with which we are here concerned can and do reversibly tautomerize to corresponding imines, thus

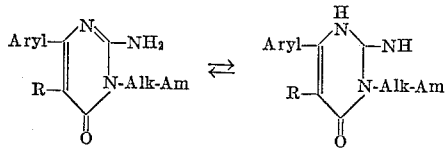

the proportions of the two tautomers present in any given circumstance being dependent upon the physical state of the substance involved, and its environment: whether it be solid or liquid and, if dissolved, in what solvent and at what pH. Accordingly, the naming and enformulation of the subject compounds as 2-amines and not 2-imines is a matter of conveniences only; both tautomeric forms are within the ambit of the described invention.

Equivalent to the amine bases of this invention for the purposes here described are corresponding nontoxic acid addition salts of the formula

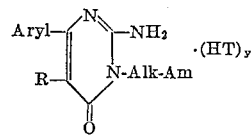

wherein Aryl, R, Alk, and Am retain the meanings previously assigned; T represents 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undersable in pharmaceutical dosage; and $y$ represents a positive integer less than 5, its precise value being dependent upon the number of basic nitrogen atoms involved in salt formation.

The compounds to which this invention relates are useful by reason of their valuable pharmacological properties. Thus, for example, they promote diuresis both directly and by blocking the effect of desoxycorticosterone acetate (DCA) on urinary sodium and potassium. The latter, anti-DCA activity is the more remarkable in that the superficially-related prior art diuretic, 2-amino-4-hydroxy-5-methyl-6-phenyl-4-pyrimidinol, has been found to be without effect in standardized tests for such activity. Other valuable pharmacological properties variously inhering in the instant compounds are anti-hyperchloesterolemic, antibiotic (versus *Tetrahymena gelleii, Trichophyton mentagrophytes,* and *Chlorella vulgaris*), and anti-inflammatory activity.

Manufacture of the claimed compounds proceeds by heating an appropriate pyrimidinol

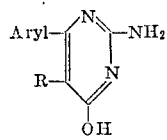

with a selected alkyl halide

Am-Alk-X in an alcoholic solvent medium containing an acid acceptor such as potassium hydroxide or sodium methoxide, and with sodium iodide to catalyze the reaction if desired. (The meanings of Aryl, R, Alk, and Am in the foregoing formulas remain as before; X represents chlorine, bromine, or iodine.)

Conversion of the basic amines of this invention to corresponding acid addition salts is accomplished by mixing the bases with from 1 to 4 equivalents, as indicated, of any of various inorganic and strong organic acids, the anionic portion of which conforms to T as hereinbefore defined.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

2-amino-3-(2-dimethylaminoethyl)-5-methyl - 6 - phenyl-4(3H)-pyrimidinone.—To a solution of approximately 20 parts of 2-amino-5-methyl-6-phenyl-4-pyrimidinol and 7 parts of sodium methoxide in 300 parts of anhydrous ethanol is added approximately 14 parts of 2-dimethylamino-ethyl chloride hydrochloride dissolved in a solution of 6 parts of sodium methoxide in 150 parts of anhydrous ethanol. The resultant mixture is maintained with agitation at room temperatures for 1 hour, then heated at the boiling point under reflux with continued agitation overnight. Solvent is removed by vacuum distillation and the residue suspended in a solution of 4 parts of sodium hydroxide in 800 parts of water. After 2 hours, insoluble solids are filtered off, washed on the filter with water until the washings are neutral to litmus, dried in air, and recrystallized from methanol. The recrystallized material, washed on the filter with ether and dried in air, is 2-amino-3-(2-dimethylaminoethyl)-5-methyl-6 - phenyl - 4 (3H)-pyrimidinone melting at 195–197°. The product has the formula

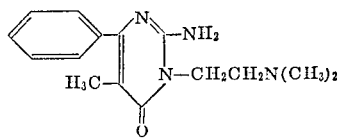

Example 2

2 - amino-3-(3 - diethylaminopropyl) - 5 - methyl - 6-phenyl-4(3H)-pyrimidinone.—Substitution of 16 parts of 3-diethylaminopropyl chloride hydrochloride for the 2-dimethylaminoethyl chloride hydrochloride called for in Example 1 affords, by the procedure there detailed, 2-amino-3 - (3-diethylaminopropyl) - 5 - methyl-6-phenyl-4(3H)-pyrimidinone, having the formula

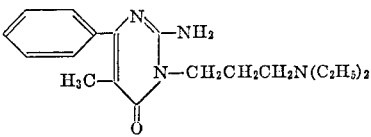

Example 3

5 - allyl - 2 - amino-3-(2-diethylaminoethyl)-6-phenyl-4(3H)-pyrimidinone.—To a solution of approximately 22 parts of 5-allyl-2-amino-6-phenyl-4-pyrimidinol and 7 parts of sodium methoxide in 300 parts of anhydrous ethanol is added 15 parts of 2-diethylaminoethyl chloride hydrochloride dissolved in a solution of 6 parts of sodium methoxide in 200 parts of anhydrous ethanol. The resultant mixture is maintained with agitation at room temperatures for 1 hour, then heated at the boiling point under reflux with continued agitation overnight. Solvent is removed by vacuum distillation and the residue suspended in a solution of 4 parts of sodium hydroxide in 800 parts of water. After 2 hours, insoluble solids are filtered off, washed on the filter with water until the washings are neutral to litmus, dried in air, and recrystallized from methanol. The recrystallized material is washed on the filter with ether. The product thus isolated is 5-allyl-2 - amino - 3-(2-diethylaminoethyl)-6-phenyl-4(3H)-pyrimidinone, of the formula

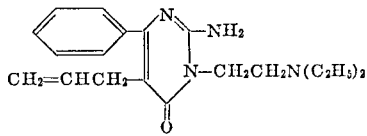

Example 4

2 - amino - 5 - methyl - 6 - phenyl - 3-(3 - pyrrolidinopropyl)-4(3H)-pyrimidinone.—Substitution of 20 parts of 2-amino-5-methyl-6-phenyl-4-pyrimidinol and 17 parts of N-(3-chloropropyl)pyrrolidine for the 5-allyl-2-amino-6-phenyl-4-pyrimidinol and 2-diethylaminoethyl chloride hydrochloride, respectively, called for in Example 3 affords, by the procedure there detailed, 2-amino-5-methyl-6 - phenyl - 3-(3-pyrrolidinopropyl)-4(3H)-pyrimidinone, having the formula

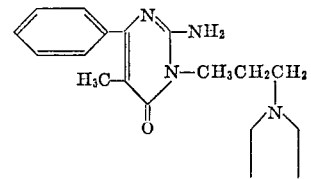

Example 5

(A) 2-amino - 6 - phenyl - 5 - (2-propynyl)-4-pyrimidinol.—A mixture of 78 parts of ethyl α-(2-propynyl) benzoylacetate and 54 parts of guanidine carbonate in 400 parts of anhydrous ethanol is heated at the boiling point under reflux for 24 hours. Solvent is thereupon removed by vacuum distillation and the residue suspended in 1000 parts of water. The suspension is neutralized with glacial acetic acid. The insoluble solids are filtered off; consecutively washed on the filter with water, cold acetone, and ether; and recrystallized from methanol to give 2-amino-6-phenyl-5-(2-propynyl)-4-pyrimidinol melting at 261–263°.

(B) 2 - amino - 6 - phenyl - 5 - (2-propynyl)-3-(3- pyrrolidinopropyl)-4(3H)-pyrimidinone.—Substitution of 22 parts of 2-amino-6-phenyl-5-propynyl-4-pyrimidinol and 17 parts of N-(3-chloropropyl)pyrrolidine for the 5-allyl-2-amino - 6 - phenyl-4-pyrimidinol and 2-diethylaminoethyl chloride hydrochloride, respectively, called for in Example 3, affords by the procedure there detailed, 2- amino - 6 - phenyl - 5-(2-propynyl)-3-(3-pyrrolidinopropyl)-(3H)-pyrimidinone, having the formula

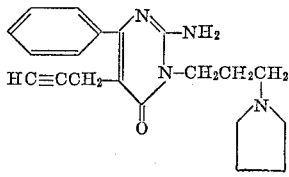

Example 6

2 - amino - 5 - methyl-6-phenyl-3-(2-piperidinoethyl)-4(3H)-pyrimidinone.—Substitution of approximately 18 parts of N-(2-chloroethyl)piperidine for the N-(3-chloropropyl)-pyrrolidine called for in Example 3 affords, by the procedure there detailed, 2-amino-5-methyl-6-phenyl-3-(2 - piperidinoethyl) - 4(3H)-pyrimidinone melting at 203—205°. The product has the formula

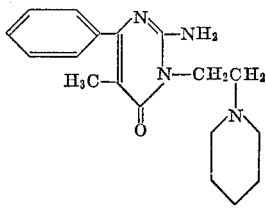

Example 7

2-amino-5-methyl-3-(2-morpholinoethyl) - 6 - phenyl-4(3H)-pyrimidinone.—Substitution of approximately 19 parts of N-(2-chloroethyl)morpholine for the N-(3-chloropropyl)-pyrrolidine called for in Example 3 affords, by the procedure there detailed, 2-amino-5-methyl-3-(2-morpholino-ethyl)-6-phenyl-4(3H)-pyrimidinone melting at approximately 234–235°. The product has the formula

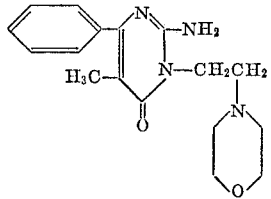

Example 8

2 - amino - 5 - methyl - 3 - (3-morpholinopropyl)-6-phenyl - 4(3H)-pyrimidinone.—Substitution of approximately 20 parts of N-(3-chloropropyl)morpholine for the N-(3-chloropropyl)pyrrolidine called for in Example 3 affords, by the procedure there detailed, 2 - amino - 5-methyl - 3 - (3 - morpholinopropyl) - 6-phenyl-4(3H)-pyrimidinone, the formula of which is

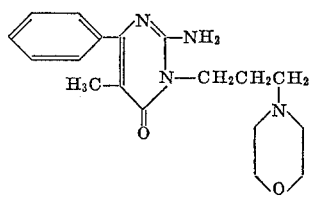

What is claimed is:
1. A compound of the formula

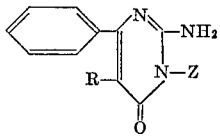

wherein R is selected from the group consisting of radicals of the formulas

—CH₃   —CH₂CH=CH₂   —CH₂C≡CH and Z is selected from the group consisting of radicals of the formulas —alkylene=N(alkyl)₂

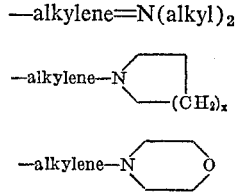

in which $x$ represents a positive integer less than 3, wherein alkylene is less than four carbon atoms and alkyl is lower alkyl.

2. 2 - amino - 3 - (2 - dimethylaminoethyl) - 5-methyl-6-phenyl-4(3H)-pyrimidinone.

3. 2 - amino - 5 - methyl - 6 - phenyl - 3 - (2 - piperidinoethyl)-4(3H)-pyrimidinone.

4. 2 - amino - 5 - methyl - 3 - (2 - morpholinoethyl)-6-phenyl-4(3H)-pyrimidinone.

5. 2-amino-6-phenyl-5(2-propynyl)-4-pyrimidinol.

References Cited

UNITED STATES PATENTS 3,322,756   5/1967   Ruschig et al. _____ 260—256.4

ALEX MAZEL, *Primary Examiner.*

JOSE TOVAR, *Examiner.*

UNITED STATES PATENT OFFICE
CERTIFICATE OF CORRECTION

Patent No. 3,378,557　　　　　　　　　　　　　　　April 16, 1968

Kurt J. Rorig et al.

It is certified that error appears in the above identified patent and that said Letters Patent are hereby corrected as shown below:

Column 2, line 72, "undersable" should read -- undesirable Column 5, line 17, "-(3H)-" should read -- -4(3H)- --; line 51, "pholino-ethyl)" should read -- pholinoethyl) --. Column 6, line 35, "-alkylene=N(alkyl)$_2$" should read -- -alkylene-N(alkyl)$_2$ --.

Signed and sealed this 27th day of January 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents